United States Patent [19]
Bennett

[11] 3,961,133
[45] June 1, 1976

[54] METHOD AND APPARATUS FOR COMBINING VIDEO IMAGES WITH PROPER OCCLUSION

[75] Inventor: William S. Bennett, Chenango Bridge, N.Y.

[73] Assignee: The Singer Company, New York, N.Y.

[22] Filed: May 24, 1974

[21] Appl. No.: 472,971

[52] U.S. Cl............................ 178/6.8; 178/DIG. 6; 178/DIG. 35; 340/324 AD
[51] Int. Cl.² ........................................... H04N 7/18
[58] Field of Search......... 178/6.8, DIG. 6, DIG. 35; 235/151; 340/172.5, 324 A, 324 AD

[56] References Cited
UNITED STATES PATENTS

| | | | |
|---|---|---|---|
| 3,441,667 | 4/1969 | Novacek | 178/DIG. 6 |
| 3,479,454 | 11/1969 | Wolff | 178/DIG. 35 |
| 3,621,214 | 11/1971 | Romney | 235/151 |
| 3,787,619 | 1/1974 | Wolff | 178/DIG. 35 |
| 3,804,977 | 4/1974 | Driskell | 178/6.8 |

Primary Examiner—Howard W. Britton
Attorney, Agent, or Firm—James C. Kesterson

[57] ABSTRACT

An image generated by a television camera is combined with an image generated from digitally stored information to form a composite scene wherein objects appearing in either image properly occlude one another with respect to the eyepoint from which the scene is viewed. This is accomplished by processing the camera video signal to provide pulses for each raster line which indicate the starting and stopping points of an object viewed by the camera. At the same time, the camera video signal is provided on a delay line to a video switch which also receives the digitally generated video signal. The switch is controlled by logic circuitry in accordance with the established occlusion priority to pass to the video display device the proper signal from either the camera or the image generator.

12 Claims, 21 Drawing Figures

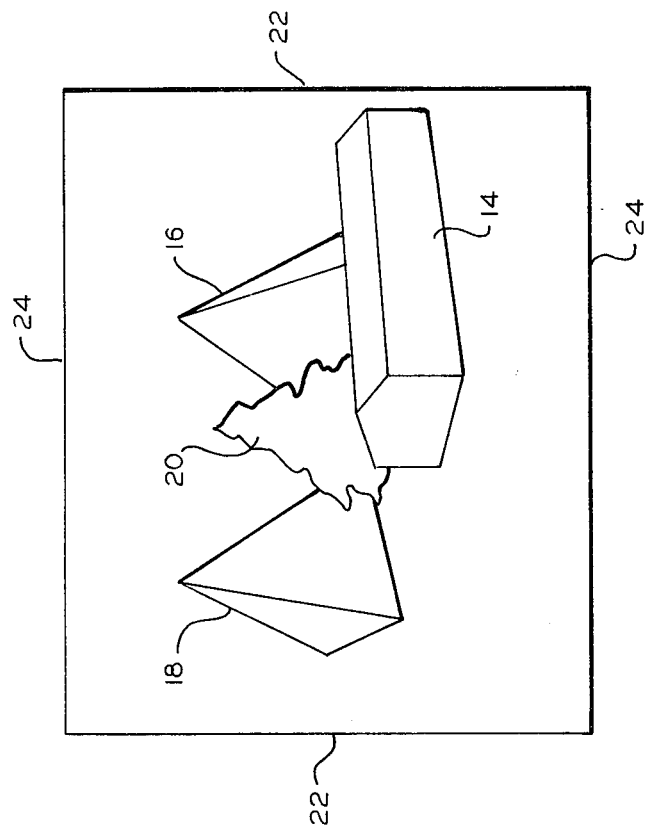
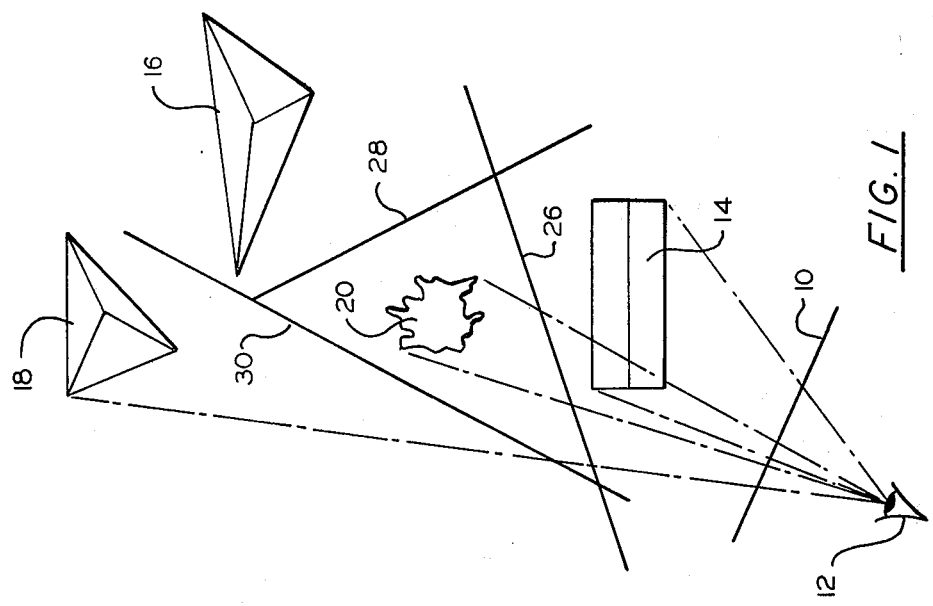
FIG. 2
FIG. 1

METHOD AND APPARATUS FOR COMBINING VIDEO IMAGES WITH PROPER OCCLUSION

BACKGROUND OF THE INVENTION

The present invention relates to video signal processing and, more particularly, to video display of images from signals generated by more than one source.

It is a common practice to store information in a form which may be generated as electrical signals suitable for input to a television display device to produce an image based on the stored information. The information may, for example, be stored in digital form in a memory unit having the required signal processing and output capability, referred to in the art as a digital image generator. Such apparatus is normally programmed to produce signals which are used to modulate the horizontal scan lines on raster lines for the purpose of producing an image.

It is sometimes desirable to include in the displayed image, a discrete area produced by signals emanating from a source other than the digital image generator, e.g., a television camera. Video insetting techniques have become well-known in the art which select from a plurality of signals available for modulating the horizontal scan lines, those signals desired for inclusion in the displayed image at any given time as the display raster is generated. For example, see U.S. Pat. No. 3,787,619 granted to Hanns H. Wolff on Jan. 22, 1974. The inset portion of the display may constitute an image positionally unrelated to the primary image into which it is inset, but displayed therewith for convenience of viewing the two images in a single display, or the two images may be related in such a way as to form a composite, single scene. In the latter case, for example, an image representing a background may be digitally generated, while an object seen by a television camera is inset into the background to provide a display showing the object appearing in front of the background.

In any case, the inset portion of the display normally constitutes a predetermined fraction of the total area of the display, regardless of the image content of such portion, or constitutes a particular object whose image is inset on the display regardless of size. Further, the prior art is typically based on the assumption that the complete inset object is closer to the eyepoint from which the display is viewed than any portion of the image into which it is inset.

Therefore, it is a principal object of the present invention to provide a method of combining in a video display, images generated from more than one source, wherein objects produced by one image source may appear closer than some and farther away than other objects produced by the other image source.

A further object is to provide a video display system having inputs from either of two signal sources controlled by a video switch wherein the image of an object represented by the signals from one source both occludes and is partially occluded by objects represented by signals from the other source depending on the assumed position of the first object with respect to the others.

Other objects will in part be obvious and will in part appear hereinafter.

SUMMARY OF THE INVENTION

Video signals are generated from two sources, viz., a digital image generator and a television camera, the direction of view and magnification of which are controlled by a circuit receiving signals from a digital computer. The camera video signals are stored, one raster line at a time, in a delay line for input at a video switch. On another line, the camera video signals are clipped to produce a rectangular wave which begins and ends with the beginning and ending of the representation by the signal of an object scanned by the camera against a non-reflecting background. The clipped signal is differentiated to provide pulses corresponding to the beginning and ending of the rectangular wave.

Binary time values corresponding to the position of the pulses on each raster line (which may, therefore, be considered as binary distances from the beginning of the raster line) are applied to the digital image generator. The binary values may then be utilized in the same way as edge intersections defining a digitally generated object. Separating plane calculations are made by the digital image generator which take into account the position in a composite scene of an object seen by the camera with respect to digitally generated objects. The edge intersection values are applied to circuits indicating which object faces are being pierced, at each point along each raster line, by a ray emanating from the eyepoint from which the scene is viewed. The video signal representing the object face which is both pierced by the ray from the eyepoint and is closest to the eyepoint is passed to the video display device by operation of the video switch under the control of the image generator circuits determining such signal. Thus, the delayed camera video signal will be used in the display when the object seen by the camera occludes digitally generated objects, and vice versa.

BRIEF DESCRIPTION OF THE DRAWING

FIG. 1 is a plan view of a scene including several objects;

FIG. 2 is an elevational view of the scene of FIG. 1 as projected on a specified plane;

DETAILED DESCRIPTION OF THE PREFERRED EMBODIMENT

Figure 3:
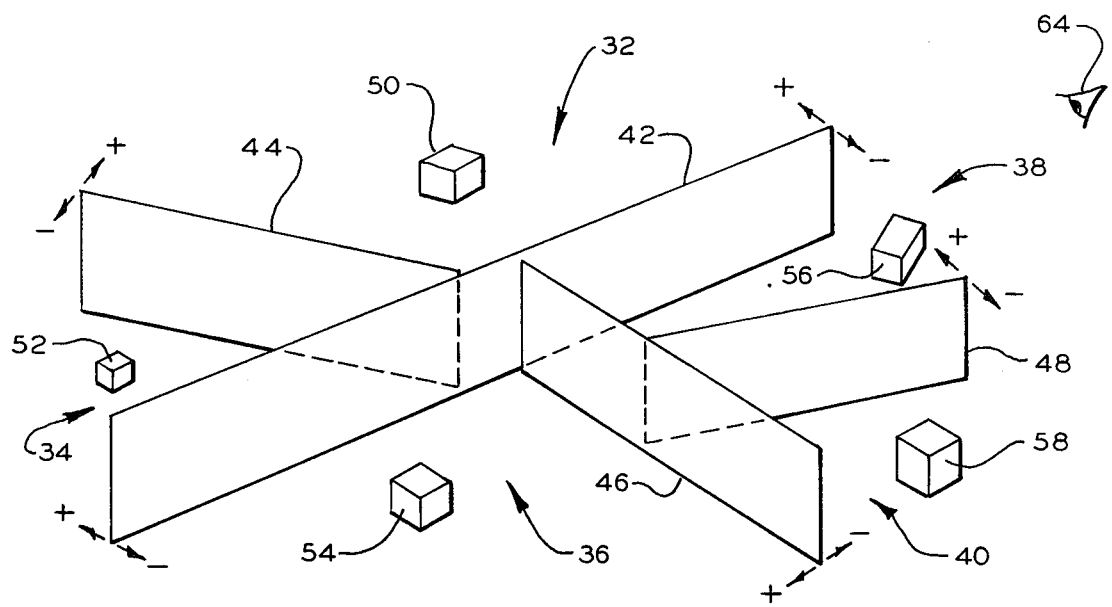
FIG. 3 illustrates a technique of using selected planes to separate objects of a scene for purposes of developing an occlusion priority list in accordance with the present invention.

In FIG. 1 is shown a plan view of a composite scene, the image of which is to be displayed by video means as projected on image plane 10, having defined vertical and horizontal boundaries. The scene is to appear on image plane 10 as viewed from eyepoint 12. Images representing objects 14, 16 and 18 are generated from signals stored in a pre-programmed source, and the image of object 20 is generated from signals provided by a video camera viewing an actual object corresponding to that displayed in the scene. The signals from the two sources are provided to a video display device, in a manner fully explaned later herein, to produce a displayed image with all of objects 14, 16, 18 and 20 appearing as they would as if all were represented by signals from a single source.

FIG. 2 illustrates the displayed image of the composite scene of FIG. 1, projected on plane 10 as seen from eyepoint 12. The scene is defined by vertical and horizontal boundaries on plane 10 denoted on FIG. 2 by reference numerals 22 and 24, respectively. Object 14 is nearest the eyepoint, and therefore occludes portions of objects 16 and 20. Object 20 is closer than either of objects 16 and 18, and therefore partially occludes both of these two objects. The displayed scene, formed by a composite of video signals from the different sources, appears substantially as it would if an actual scene containing all objects in the scene were viewed by a single camera.

Devices known as digital image generators are well known in the television art, and have been commercially employed for a number of years. Such devices normally comprise a memory unit which is programmed with information appropriate to produce output signals which selectively modulate the successive scan lines of a TV raster of a video display device. The nature of the signals is such as to produce an image on the display device representing an object pattern or a scene commensurate with the programmed information and the digital image generator. More detailed information concerning the operation of typical image generation systems is available in the following publications and patents:

1. "Study for Applying Computer Generated Images to Visual Systems" by the General Electric Staff. Work on this study was sponsored by The Training Research Division of the Air Force Human Resources Laboratory, Wright-Patterson Air Force Base, Ohio. The document was published as AFHRL-TR-69-14 on Sept. 19, 1969.

2. "A Realtime Visible Surface Algorithm" by Gary Scott Watkins. Published by the Computer Science Department of the University of Utah, June 1970. Work was supported at least in part by the Advanced Research Projects Agency of the Department of Defense, Rome Air Development Center, Rome, N.Y., under Contract AF30(602)-4277.

3. U.S. Pat. No. 3,602,702 to Warnock, Aug. 31, 1971; U.S. Pat. No. 3,621,214 to Romney et al, Nov. 16, 1971; U.S. Pat. No. 3,665,408 to Erdahl et al, May 23, 1972; and U.S. Pat. No. 3,736,564 to Watkins, May 29, 1973.

However, to aid in understanding the present invention, a very brief explanation of a typical digital image generation system is included. It will also be recognized, of course, that the present invention would be suitable for use with other systems as well as with the described system. As was mentioned above, digital image generation devices normally comprise a memory unit programmed with information necessary to produce the desired modulating signals. This stored information includes data concerning, with respect to image plane 10, the location in three dimensional space of each digital object, such as objects 14, 16 and 18, in a scene. For every sweep of the electron beam which makes up the display raster of the display device, this stored data is then processed along with input data from a computer concerning the relative location of the viewing point to determine which of the objects are occluded either totally or in part by the other objects in the scene along a line of sight from the viewing point through the complete scene. After determining which objects are occluded and which should be visible, i.e., not occluded, the digital image generator then provides the necessary signal to modulate the scan line to produce a visible output on the display device. This visible output, when combined with the visible output produced by other modulated scan lines, generates an appropriate image of the scene as would appear from the viewing point. It will be appreciated, of course, that in actual operation it may be desirable that the viewing point move from one position to another. However, the relative speed of the moving viewing point with respect to the generation of a raster line is so slow the viewing point may be assumed to be stationary during the computation of the signals necessary for modulating a single raster pattern.

In the present embodiment, for example, the digital image generator includes the capability of shifting the assumed eyepoint from which the scene is viewed. Therefore, means such as that mentioned above must be provided for repetitively solving the occlusion priority of a plurality of objects included in the scene. Thus, the memory unit must be programmed with information suitable for generating signals representing at least one complete face of several objects. The position of the eyepoint with respect to the relative positions of the objects in the scene may be such that an object closer to the eyepoint would obstruct the view of a portion of a more distant object. As the eyepoint position is shifted, a greater or lesser portion of the more distant object will be obstructed or occluded by the nearer one. Thus, the signal representing the image of the more distant object must be inserted at a different point in the scan lines in order to display the scene in the desired perspective.

One method of solving the occlusion problem involves separating each object in a scene from all others by imaginary planes, such as those designated by reference numerals 26, 28 and 30 in FIG. 1. Thus, each object is in a separate "pocket" formed by the separating planes. Information representing the image of at least one complete face of the object in each separate pocket is stored in the memory unit for output upon command by the digital image generator of those portions of the face or faces not occluded by another object. It is of particular importance to note at this point that for the purposes of this invention, as shown in FIG. 1, object 20 is also in its own pocket, although it is not one of the objects whose image is digitally generated.

Figure 4:
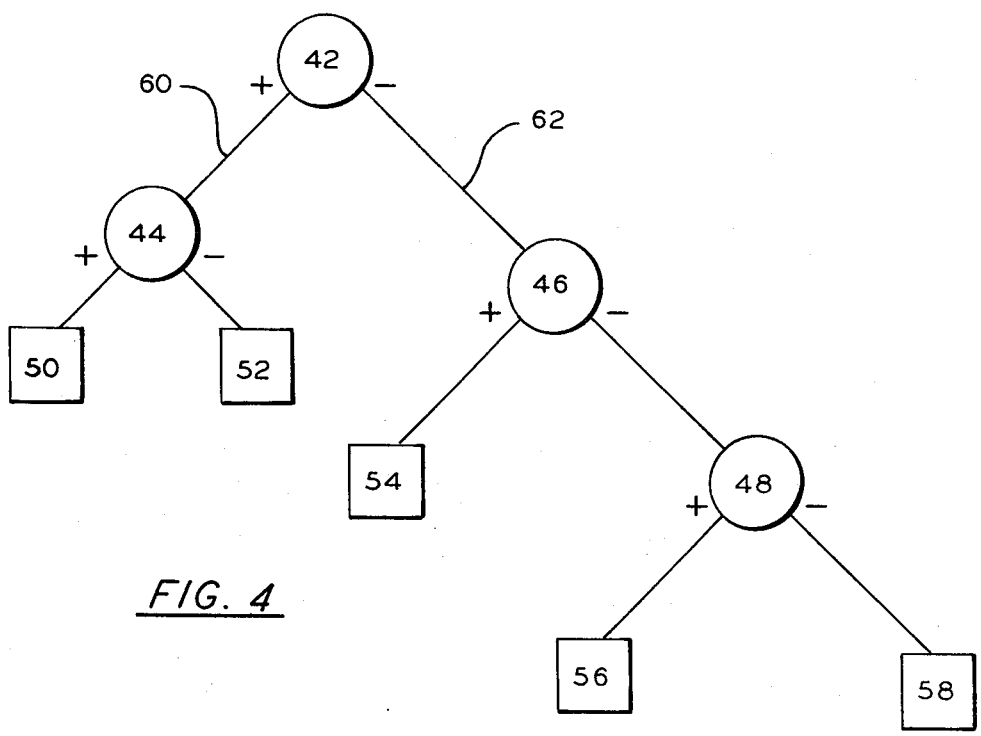
FIG. 4 illustrates a binary tree developed from the objects and separating planes of FIG. 3 for purposes of developing said occlusion priority list.
Figure 5:
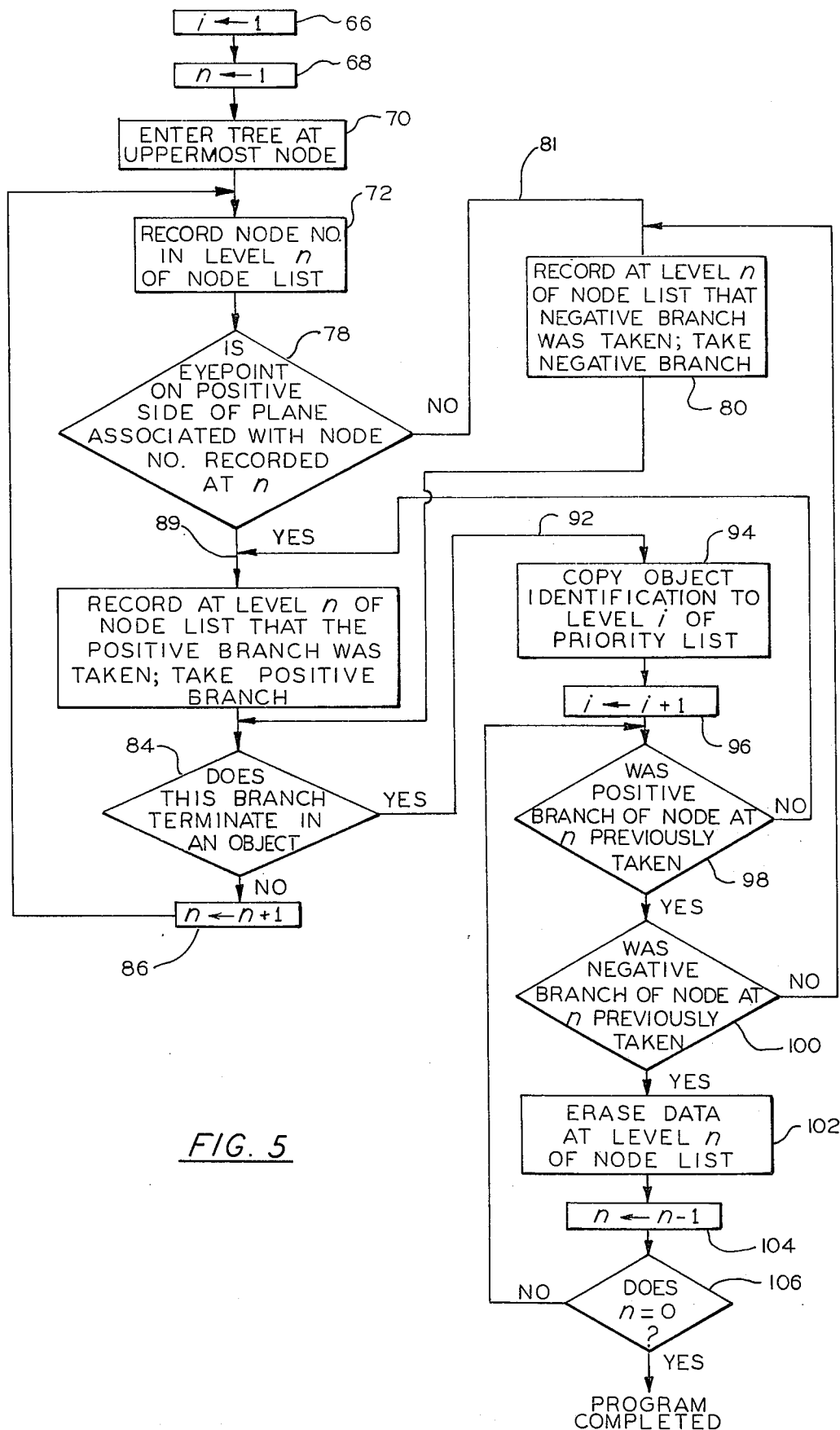
FIG. 5 is a flow diagram suitable for use with a digital computer for developing said occlusion priority list from the binary tree of FIG. 4.
Figures 6A, 6B, 6C, 6D, 6E:
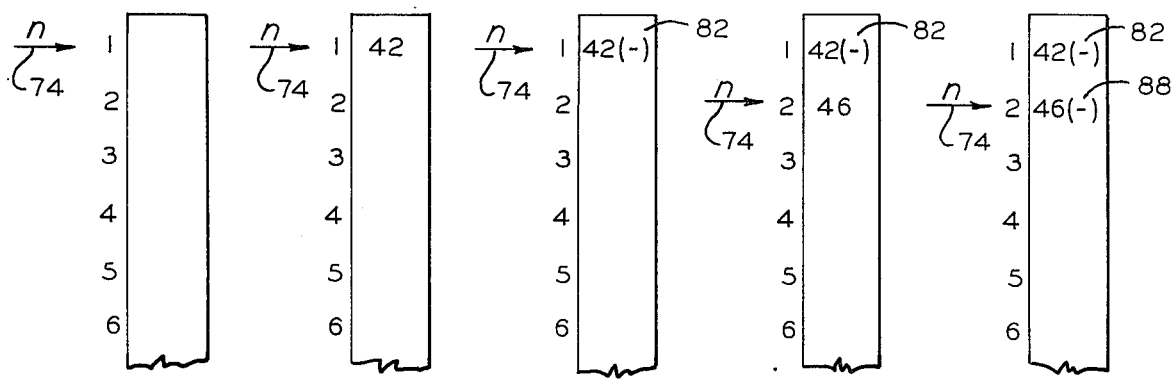
FIGS. 6a and 6i represent the various stages of a group of storage registers in a digital computer during the developing of the occlusion priority list according to the flow diagram of FIG. 5.
Figures 6F, 6G, 6H, 6I:
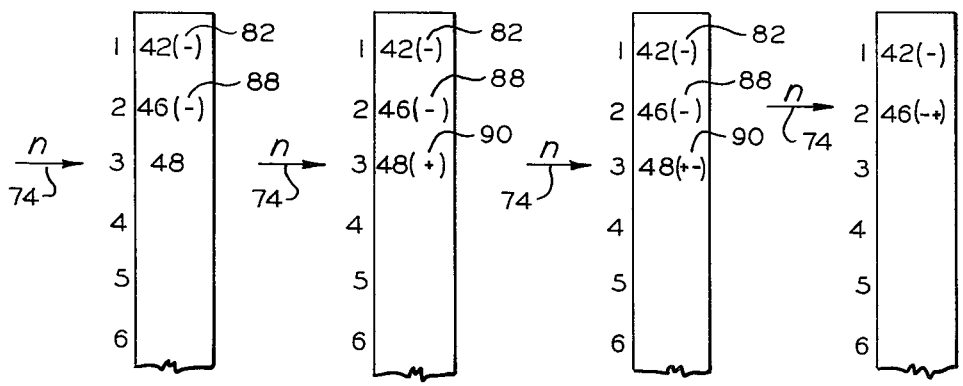
Figures 7A, 7B, 7C, 7D:
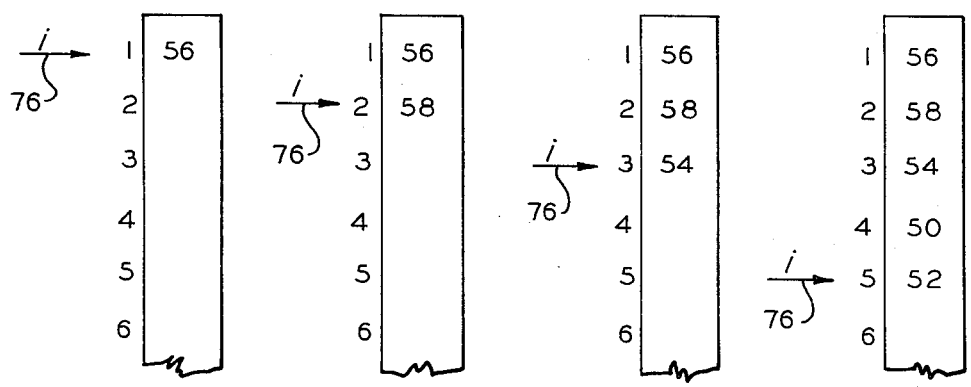
FIGS. 7a through 7d represent the occlusion priority list stored in a group of registers at different stages of its development according to the flow diagram of FIG. 5.

To further aid in understanding the occlusion problem and to illustrate one technique as to how it may be solved, refer now to FIGS. 3 and 4. Pockets 32, 34, 36, 38 and 40 formed by separating planes 42, 44, 46 and 48 are shown in FIG. 3 as containing objects 50, 52, 54, 56 and 58. These pockets and planes may be organized in a mathematical binary tree as shown in FIG. 4. The numbers in the circles and squares making up the binary tree of FIG. 4 correspond respectively to the reference numbers of the planes and objects shown in FIG. 3. Thus, the uppermost node in the tree is a representation of separating plane 42 which divides the scene or space into two parts. Branches 60 and 62 emanating from the uppermost node represent the space or scene on the two sides of separating plane 42 shown as positive and negative, respectively. The lower nodes (circles) shown in FIG. 4 which represent the other separating planes successively subdivide the space or scene into still smaller parts. Thus, the space or scene is repeatedly divided until it represents the pockets 32, 34, 36, 38 and 40 which contain only the respective objects 50, 52, 54, 56 and 58. According to the present invention, the objects contained in the individual pockets may represent either convex polyhedrons, which are digitally generated, or, they may represent objects viewed by camera. A program suitable for execution by a digital computer for generating an occlusion or priority list is shown in FIG. 5. This process makes use of the separating planes and binary mathematical tree concepts. Thus, using this program and the associated concepts, an occlusion list can be generated for any known viewing point. For example, assuming a scene as shown in FIG. 3, the priority or occlusion list for viewing point 64 is determined as follows. As shown in blocks 66 and 68, registers $i$ and $n$ are both normalized or set equal to 1 for the start of the program. Then, as is shown at block 70, the program is entered at a point which represents the uppermost node 42 of the binary mathematical tree of FIG. 4. The number of this uppermost node is then recorded in a node list of the type shown in FIG. 6a as shown at instruction 72. Pointer 74 of FIGS. 6a through 6a and pointer 76 of FIGS. 7a through 7d represent the registers making up the list at which data is entered and retrieved. Now, recalling that at block 68, $n$ was set equal to 1, the number of the uppermost node 42 is recorded at the $n = 1$ level of the node list shown in FIG. 6b. The program then progresses to the next block 78 where the determination is made whether eyepoint 64 is on the positive side of the plane associated with node 42. In the present example, the eyepoint is on the negative side of separating plane 42 and, therefore, in accordance with instruction 80, the negative or node branch 81 of block 81 of block 78 is taken. This fact is also recorded at the $n$ level of the node list as represented by the negative sign 82 shown in FIG. 6c. The program then progresses to the next instruction 84 which determines whether or not the branch terminates in an object. In the present example, the branch does not terminate in an object and in fact terminates in node 46. Therefore, in accordance with instruction 86, the node list level $n$ is increased by 1 and is now equal to 2. The program now returns us to block 72 where node 46 is now recorded at level 2 of the node list as shown in FIG. 6d. A determination is again made as to whether or not the eyepoint is on the positive side of the separating plane. As before in this example, the eyepoint is not on the positive side of the plane. Therefore, again taking branch 81, the fact that the negative branch was taken is recorded at the $n = 2$ level of the node list as shown by negative sign 88 of FIG. 6e. At instruction 84, the question is again asked if the branch terminates in an object; the answer is again No as the branch terminates in node 48. As before, the value of $n$ is incremented at instruction 86 from 2 to 3 (i.e., $2 + 1 = 3$). Therefore, the node 48 is recorded in the $n = 3$ level of the node list, in accordance with block 72 of FIG. 5. This is shown in the node list of FIG. 6f. The question is again asked, is the eyepoint on the positive side of the plane? This time, the answer is Yes and, therefore, branch 89 of block 78 is taken. Thus, the fact that the positive branch of the node was taken is recorded, as represented by positive sign 90 in FIG. 6g. The question is again asked, does this branch terminate in an object? This time, the answer is Yes and, therefore, branch 92 is taken. Then, according to instruction 94, the identification of the object 56 which is in the same pocket 38 with eyepoint 64, is recorded at the $i = 1$ or top level of the priority list as shown in FIG. 7a. As shown at instruction 96, the $i$ level of the priority list is increased to 1 so that $i$ now equals 2. The next instruction 98 determines whether the positive branch of node 48 at the $n = 3$ level was previously taken. In this instance, the answer is Yes as the positive branch was taken and terminated in the object 56. Therefore, the question is asked at instruction 100, was the negative branch of the node at $n$ taken? The answer is, of course, No. Therefore, the program returns to instruction 80 which now adds a positive sign for node 48 at the $n = 3$ level of the node list as shown in FIG. 6h. Thus, as shown in FIG. 4, we are taking the negative branch from node 48. From this point of the program, we go to the instruction in block 84 again which determines whether this negative branch terminates in an object. Again the answer is Yes, as the branch terminates in object 58. The next instruction 94 is to copy the object 58 identification into the level $i$ of the priority list. It will be recalled that $i$ was increased to 2; therefore, the identification of the object 58 is put in the priority list at level 2 as shown in FIG. 7b. Again, $i$ is increased by 1 such that $i$ now equals 3. The questions are then determined at blocks 98 and 100 whether both positive and negative branches were taken. The answer, of course, is Yes in both cases. Therefore, the program advances to the instruction 102 where the data in the $n = 3$ level of the node list is erased, and the next program instruction 104 decreases the $n$ level by 1 such that $n$ now equals 2. Thus, the node list is now once again in the condition as shown in FIG. 6e. The question is then asked at instruction 106, does $n = 0$? Of course, since $n$ was just set equal to 2, the answer to this is No. The program returns to block 98 where the question is again asked whether or not the positive branch at the node recorded in level $n = 2$ has been previously taken.

It might be helpful to note at this point that the $n$ level is now 2 and that the node in $n$ level 2 is 45 ($-$). Thus, recalling that the negative branch of node 46 was previously taken and that the positive branch has not been taken, the answer to the question asked at instruction block 98 is, of course, No. Therefore, the next instruction block is 60 where the next instruction is to record at level $n$ (recalling level $n$ is now 2 rather than 3) that the positive branch is to be taken. Therefore, a positive ($+$) sign at level $n = 2$ for the node 46 is added as shown in FIG. 6i. The next instruction asks the question, does this branch terminate in an object? The answer, of course, is Yes as the branch does terminate in object 54. Therefore, as before, the identification of the object, which in this case is 54, is copied into the priority list at the $i = 3$ level as shown in FIG. 7c. Recall that $i$ was set equal to 3 earlier. The $i$ level then is increased by 1 more such that $i$ now equals 4. Thus, it can now be seen that the first three objects in the priority list have been determined: item 56 is of top priority, item 58 is of next priority, and item 54 is third priority. This process continues in the manner already discussed until all five objects 50, 52, 54, 56 and 58 have been put in their correct priority, and until the $n$ level has been decremented to $n = 0$ at instruction 104. When $n = 0$, the program is completed as shown at instruction 106. In this example, the final priority of the different objects for eyepoint 64 is as shown in FIG. 7d.

Thus, there has been developed the correct occlusion priority list from eyepoint 64 of the scene shown in FIG. 3. This priority list is, of course, proper only for the condition when the eyepoint is on the same side of each of the planes as in the example above. As the eyepoint is moved to any other location or pocket, it will be necessary to develop a different priority list. Such determination is, of course, accomplished in the manner just discussed.

Thus, with the arrangement of objects and separating planes, shown in FIG. 1, occlusion priority can readily be assigned to each object in the scene, whether produced by the digital image generator or the TV camera, in accordance with its distance from the eyepoint. The objects (both digitally generated and those produced by the TV camera) are arranged in an ordered list according to the occlusion priority with no object being allowed to occlude another object which is higher on the list. It is therefore necessary to know, for any ray extending from the eyepoint through the scene, which objects are pierced by the ray so that the closest object can be selected by reference to the ordered list of objects.

Figure 8:
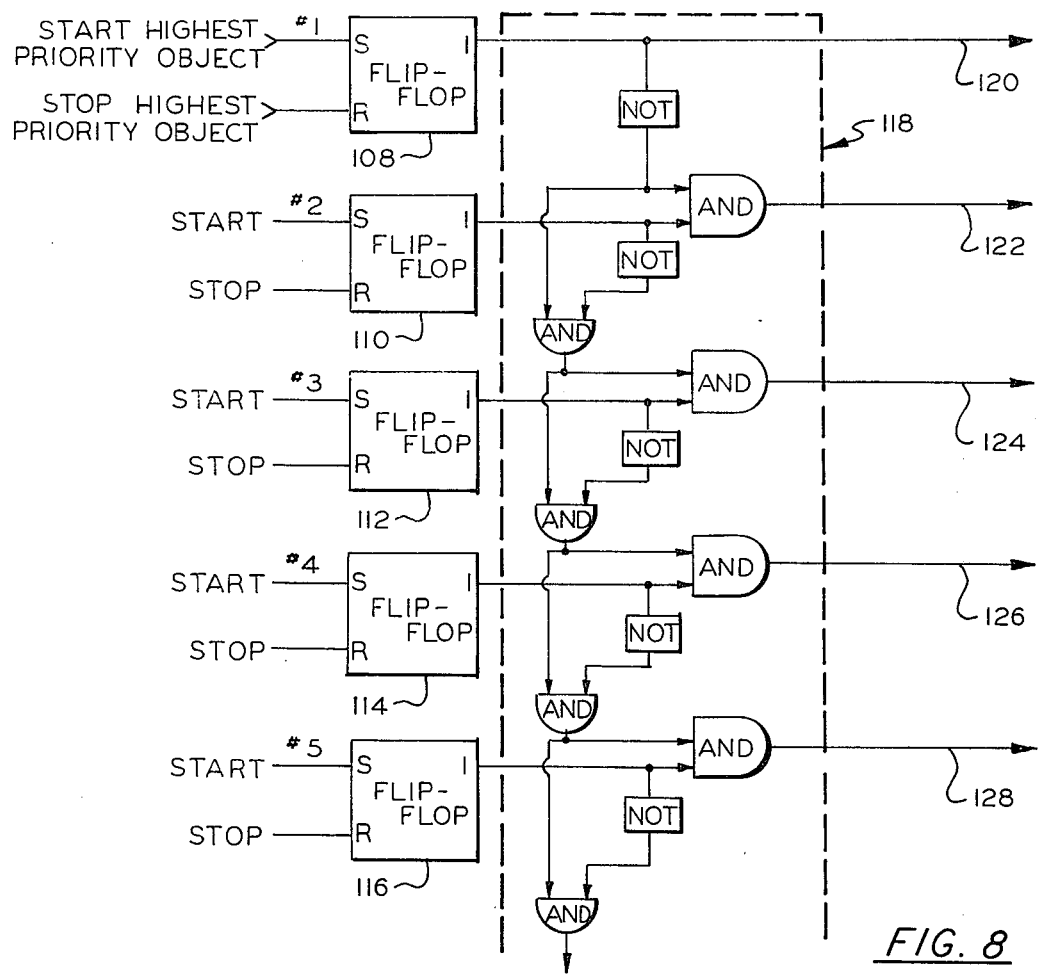
FIG. 8 shows circuitry according to one embodiment of the present invention for generating priority signals associated with each object of a scene to be displayed.

Thus, again considering for a moment only the generation of the digital objects 14, 16 and 18, the rays are considered to originate at eyepoint 12 and pass successively through points on parallel, horizontal lines thereby forming a scan line or raster on image plane 10. As the modulating signals for the display device of each line in the raster are generated by the digital image generator, segments of each raster line which represent the face of the object closest to the eyepoint for each ray from the eyepoint become visible. The visible raster line segments are determined ordinarily as a function of the positions on the complete raster line of the intersections of the projections of the edges defining the limits of the face of each object. The signals are characterized by producing a color and/or intensity associated with the particular object face which they represent. The positions of edge intersections on the raster lines may, of course, be represented as binary numbers commensurate with the distances along the raster line of each such intersection. From consideration of the positions of the intersections, the faces pierced at any given time by the ray from the eyepoint can be determined, and the signal representing the color or intensity of the face closest to the eyepoint generated. A technique for determining the closest object face pierced by the ray from the eyepoint and generating a signal representative thereof is as follows. This technique, which is suitable for the present invention, uses data representative of the intersection of object edges with scan lines and the position of the object in the occlusion or priority list as developed from the binary mathematical tree discussed heretofore. FIG. 8 illustrates the logic diagram of suitable circuits for this technique. One of the flip flops 108 through 116 is associated with each object in the scene according to its position in the priority or occlusion list for each eyepoint. However, if the viewing point is moved out of the original object pocket into another object pocket, then the list of objects in the priority list will be changed which will, in turn, change the flip flops associated with some of the objects. Now, according to FIG. 8, the object at the highest level in the priority list is associated with flip flop 108; the object next on the list is associated with flip flop 110, etc. Thus, in accordance with the priority list shown in FIG. 7d, if the scene represented by FIG. 3 is viewed from eyepoint 64, it can be seen that objects 56, 58, 54, 50 and 52 are associated with flip flops 108, 110, 112, 114 and 116, respectively. In operation, each flip flop is set when the scan ray crosses an intersection and begins to pierce the object, and is reset when the ray crosses the intersection where the ray ceases to pierce the object. Therefore, during each scan line or sweep, each of the flip flops will be set and will provide an output signal at those points along the scan line where the ray from the viewing point pierces the associated object. Thus, each flip flop provides an output only when its associated object is pierced by a ray from the viewpoint. The outputs from the set flip flops (i.e., those providing a signal) are then controlled by logic circuitry 118 which contains AND and NOT gates connected such that only the flip flop signal associated with the highest priority object will be transmitted through logic circuitry 118. It can be seen, therefore, that any time flip flop 108 is set, it will provide an output on line 120 and exclude any other output from being transmitted therethrough. Simiarly, assuming flip flop 108 is not set, then if flip flop 110 is set, it will provide an output on line 122 to the exclusion of the other outputs 124, 126 and 128. However, if while flip flop 110 is providing an output, flip flop 108 is subsequently set, the output from flip flop 110 will be interrupted and the output from flip flop 108 initiated. This is because, of course, flip flop 108 is associated with the object of highest priority. The remaining flip flop circuits operate in a similar manner such that each has a specific priority and can provide an output from control circuitry 118 only so long as a flip flop having a higher priority is not set. Thus, it can be seen that if several objects are pierced by the same ray from the viewpoint point, only the flip flop associated with the object having the highest level in the occlusion or priority list can transmit a signal through logic circuitry 118.

Now, according to the present invention, the image or object provided by the camera source is also considered, and modulating signals from the camera source may also be provided to the display device when appropriate as a function of the position on the complete raster line of the intersection of the projection of the edges of the camera image. As in the case of the digitally generated objects, and as will be further explained hereinafter, the position of edge intersections on the raster line of the camera image is also represented by binary numbers commensurate with the distance along the raster line of each such intersection. Thus, in the present invention, both the faces of digitally generated objects and the camera image which are pierced at any given time by the ray from the eyepoint can be determined, and the signals representing those objects (digitally generated or camera image) not occluded by another object are applied to the display device.

Figure 9:
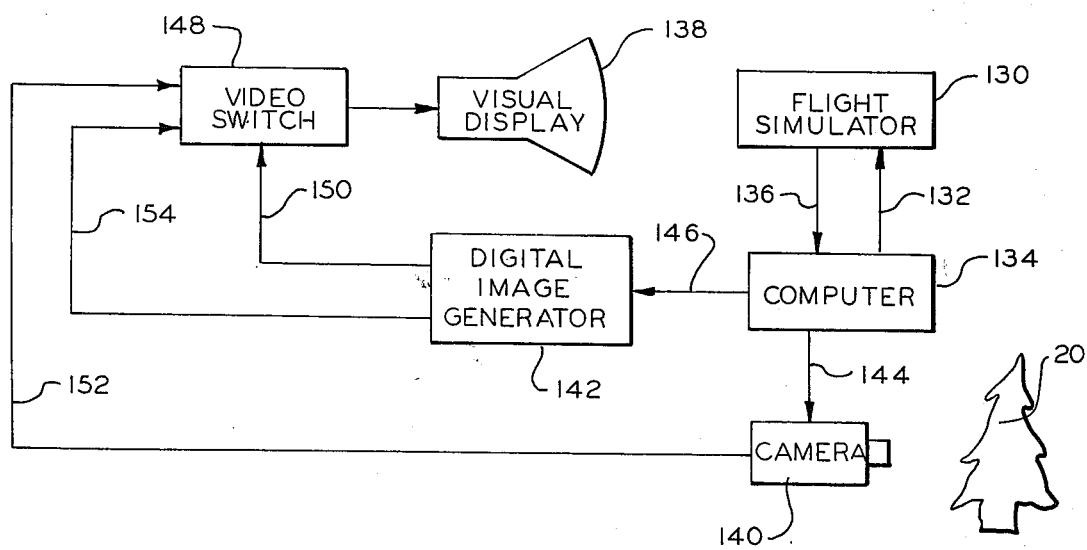
FIG. 9 is a systems diagram of a preferred embodiment of the invention showing the functional interconnection of major elements.

The principle of the present invention is generally illustrated by the block diagram of FIG. 9. One common application of visual systems employing digital image generation is the field of flight simulation. For increased realism of training, it is customary to provide in conjunction with flight simulators and the like, a visual display approximating as closely as possible a real-world scene which would be viewed from the cockpit of an actual aircraft. A variety of such visual systems are presently in commercial use, including those employing video display devices, and require no further explanation.

Block 130 represents a conventional flight simulator having the usual controls, instruments, motion system, etc. Various portions of simulator 130 are controlled in known manner by signals on line 132 from general purpose digital computer 134 which includes a section programmed with the flight and engine equations of the aircraft represented by simulator 130. At the same time, signals are provided on line 136 from simulator 130 to computer 134 representing such things as operator movement of controls, switches, etc.

Arranged for viewing by a trainee in simulator 130, either directly or with the aid of mirrors, lenses, or other optical means, is a visual display device represented diagrammatically in FIG. 9 at 138. In the present invention, device 138 comprises a video display device such as a CRT. Device 138 is adapted to receive video signals, and produce an image in response thereto, from either of television camera 140 or digital image generator 142. The direction of view and magnification of camera 140 are controlled by signals on line 144 from computer 134 which may, in turn, be influenced by inputs from simulator 130.

Digital image generator 142 also receives signals from computer 134 on line 146 indicating the position of eyepoint 12 of FIG. 1, thereby determining the edge intersection positions and affecting occlusion calculations. Video switch 148 is controlled by a command signal on line 150 from digital image generator 142 to pass video signals from either camera 140 or digital image generator 142 to display 138 on lines 152 and 154, respectively.

Figure 10:
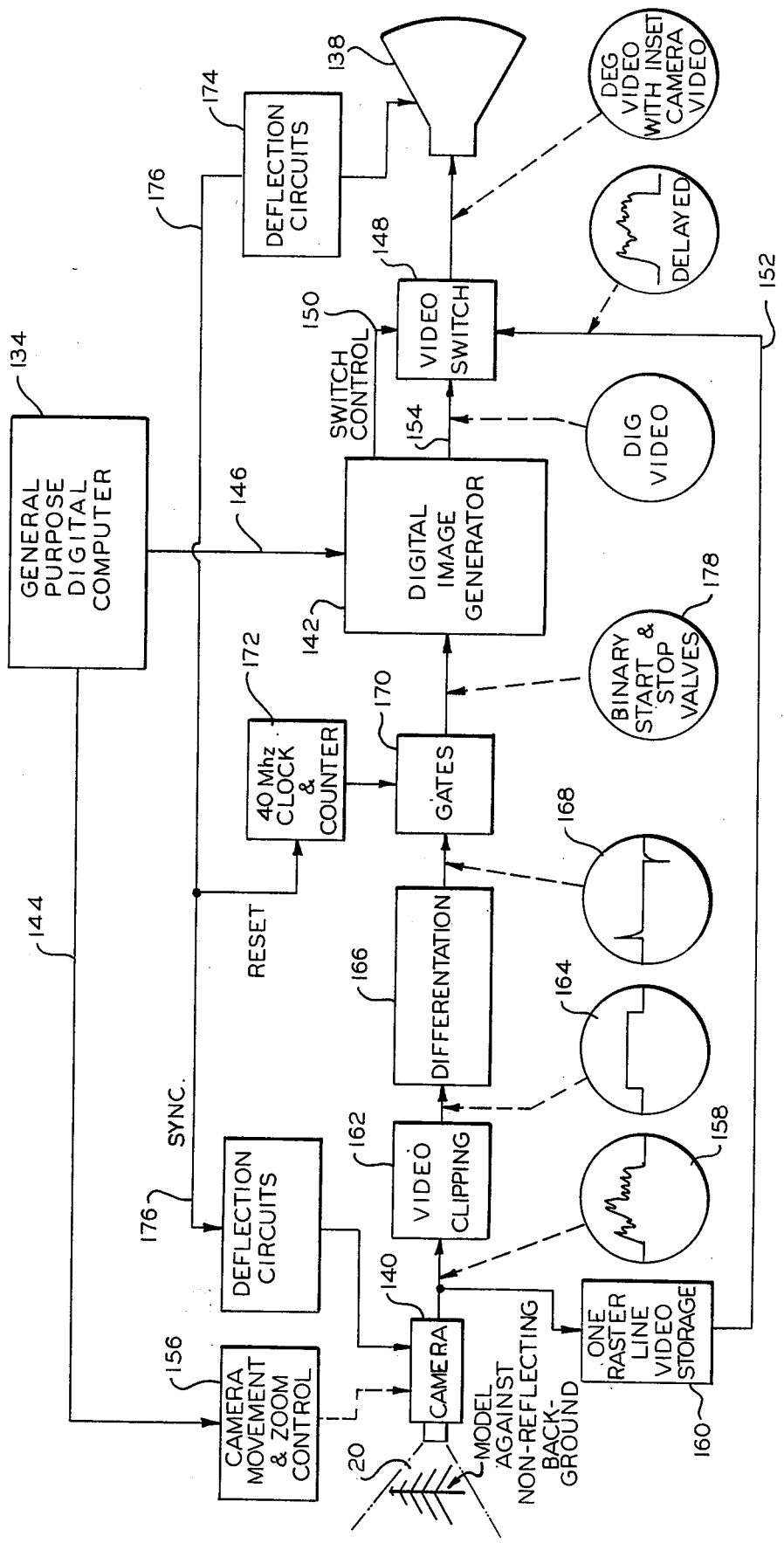
FIG. 10 is a diagram showing in block form all components, with waveforms at appropriate points to facilitate explanation of the invention.

Details of the invention are more fully shown in FIG. 10, to which reference is now made. Object 20 (the same reference numbers are used wherever possible for the four FIGS. 1, 2, 9 and 10) is viewed by camera 140, having conventional elements represented by block 156 for controlling direction and magnification thereof in accordance with signals provided in known manner from computer 134. Video signals from camera 140, represented by waveform 158, are provided to both storage device 160 and video clipper 162. The storage device represented by block 160 is an ordinary delay line for providing the signals from camera 140, one raster line at a time, to video switch 148 after a predetermined time delay. Clipper 162 includes standard circuitry providing a rectangular wave output, represented by waveform 164, corresponding in time to the beginning and end of the signals from camera 140 which represent the image of object 20 on the raster line. Rectangular wave 164 is differentiated electronically in differentiator 166 to produce two pulses, as shown by waveform 168, corresponding to the beginning and ending time of square wave 164. That is, the pulses appear in timed relation on each signal line commensurate with the time when the image of the model is portrayed on the raster line.

These pulses 168 are applied to gating circuitry 170 which gates a binary representation of the number of clock pulses accumulated in clock and counter unit 172. (In the embodiment shown in FIG. 10, the clock included in unit 172 operates at a frequency of 40 megahertz.) By this means, binary values representing the number of 40 megahertz clock pulses accumulated in a counter and which also represent the start and stop times at which the image of object 20 occurs on the raster line are gated to digital image generator 142. This is accomplished by the circuitry shown in FIG. 10 by a synchronized signal from deflection circuits 174 which is provided on line 176 to reset counter 172 at each scan. The binary time values, represented at 178, may also be considered as the binary distance from the beginning of the raster line to the beginning edge intersection of the object and the binary distance from the ending edge intersection to the end of the raster line.

The signals representing binary distance values are then used by digital image generator 142 in the same manner as the aforementioned edge intersections defining a face of a digitally generated object. These intersections will be applied to the logic circuits that indicate which object faces are being pierced by the ray from eyepoint 12 of FIG. 1 and will be associated with the occlusion priority assigned to object 20 in the separating plane calculations of the digital image generator. When the face of object 20 is both being pierced by the ray and is the closest face to eyepoint 12, a signal is emitted by the digital image generator on line 150 to cause video switch 148 to substitute the delayed camera video signal on line 152 for the digital image generator video signal on line 154 which is otherwise passed by the switch to display device 138.

Thus, it can be seen that the image viewed by camera 140 and the image generated and provided by digital image generator 142 are uniquely combined by the techniques of the present invention to produce a combination image having proper occlusion of all objects (both digitally generated and produced by the camera) included in the combined image according to the desired relative positions of the objects.

Although the present invention has been described with respect to specific methods and apparatus, it is not intended that such specific references be limitative upon the scope of the invention except insofar as set forth in the following claims.

I claim:

1. A method of producing a composite image on a display device from a combination of digitally generated video signals representative of selected objects and camera generated video signals representative of other selected objects not suitable for digital generation, said composite image providing a two-dimensional presentation of a three-dimensional scene as seen from a selectively variable eyepoint, said method comprising the steps of:

providing raster formatted camera generated video signals representative of a two-dimensional presentation of an assumed image plane of a first object not suitable for digital generation included in said three-dimensional scene as viewed from a selected eyepoint;

providing raster formatted digitally generated video signals representative of a two-dimensional presentation on said assumed image plane of a second object included in said three-dimensional scene as viewed from said selected eyepoint;

synchronizing said camera and digitally generated raster formatted video signals with the generation of raster lines on a display device;

determining, at selected edges of said first and second objects two-dimensional presentation on said assumed image plane, which of said first and second objects pierced by a ray from said selected eyepoint passing through said assumed three-dimensional scene and said two-dimensional presentation is closest to said eyepoint;

applying said raster formatted camera video signals to said display device when said first object is closest to said eyepoint;

applying said raster formatted digitally generated video signals to said display device when said second object is closest to said eyepoint; and modulating in response to said applied camera and digitally generated raster formatted video signals said raster lines of said display device to generate a two-dimensional display of said three-dimensional scene as seen from said selected eyepoint wherein those portions of said first object not occluded by said second object are displayed and those portions of said second object not occluded by said first object are displayed.

2. The method of claim 1 and further comprising the step of delaying for a predetermined time interval said raster formatted camera generated video signals between said providing thereof and applying to said display device.

3. The invention according to claim 1 and further including the step of electronically clipping undelayed samples of said camera generated video signals to generate a square wave representative of the beginning and ending of the portion of each of said camera generated video signals which represent said viewed object.

4. The method according to claim 1 and further including the step of generating electrical pulses having a time relationship commensurate with the beginning and ending of camera generated video signals which represent said first object.

5. Apparatus for producing a composite image on a display device from a combination of digitally generated video signals representative of selected objects and camera generated video signals representative of other selected objects not suitable for digital generation, camera means for providing raster formatted video signals representing a two-dimensional presentation on an assumed image plane of a first object not suitable for digital generation included in said three-dimensional scene as viewed from a selected eyepoint;

digital image generation means for providing raster formatted video signals from stored information representing a two-dimensional presentation on said assumed image plane of a second object included in said three-dimensional scene as viewed from said selected eyepoint;

means for determining, at selected edges of said first and second objects' two-dimensional presentation on said assumed image plane, which of said first and second objects pierced by a ray from said selected eyepoint passing through said three-dimensional scene and said two-dimensional presentation is closest to said selected eyepoint, and for providing control signals representative of which of said first and second objects is closest to said selected eyepoint;

switching means responsive to said control signals for receiving said camera and digitally generated raster formatted video signals and for passing therethrough said raster formatted camera video signals when said first object is closest to said selected eyepoint and for passing therethrough said raster formatted digitally generated video signals when said second object is closest to said selected eyepoint; and display means responsive to said camera and digitally generated raster formatted video signals passing through said switching means for modulating raster lines generated by said display means to provide a two-dimensional display of said three-dimensional scene as viewed from said selected eyepoint wherein those portions of said first object not occluded by said second object are displayed and those portions of said second object not occluded by said first object are displayed.

6. The apparatus of claim 5 and further comprising computer means connected to said camera means and said digital image generation means for providing information concerning the location of the eyepoint from which the assumed scene is viewed.

7. The apparatus of claim 5 wherein said display means is a cathode ray tube.

8. The apparatus of claim 5 and further including means for delaying said raster formatted camera video signals between the providing thereof and modulation of said raster lines of said display means.

9. The apparatus of claim 5 wherein said control signals are provided by a plurality of means for generating a plurality of signals, each of said plurality of means being associated with a selected object in said three-dimensional scene in accordance with the distance of the object to said selected eyepoint, and each of said plurality of signals indicative of with said selected object the generation of the raster formatted video signal associated and wherein said switching means includes logic circuitry for passing therethrough only that one of said plurality of signals then being generated by said plurality of means which is associated with the object closest to said eyepoint.

10. The apparatus of claim 5 wherein said camera means is a television camera, and said display means is a cathode ray tube.

11. The apparatus of claim 5 and further comprising:
clock means to provide timing signals for synchronizing the raster formatted video signals produced by said camera means and said digital image generation means; and means responsive to said raster formatted camera generated video signals for generating pulse signals indicative of the location along a raster line of the image of said first object.

12. The apparatus of claim 11 wherein said means for generating pulse signals comprises:
an electronic clipping circuit for clipping said camera video signals to generate a square wave, the leading and lagging edges of said square wave corresponding to the beginning and ending of the portion of each of said camera video signals which represent said viewed object; and differentiating means for differentiating said square wave to generate pulses having a timed relationship commensurate with the leading and lagging edges of said square wave.

* * * * *

UNITED STATES PATENT OFFICE
CERTIFICATE OF CORRECTION

PATENT NO. : 3,961,133
DATED : June 1, 1976
INVENTOR(S) : William S. Bennett

It is certified that error appears in the above-identified patent and that said Letters Patent are hereby corrected as shown below:

Column 5, line 42, change "6a" (second occurrence) to --6i--.

Column 11, line 49 (claim 5) insert --said composite image providing a two-dimensional presentation of a three-dimensional scene as seen from a selectively variable eyepoint comprising: -- after "generation,".

Column 12, line 38, move "with said selected object" to line 40, following the word "associated".

Signed and Sealed this

Nineteenth Day of October 1976

[SEAL]

*Attest:*

RUTH C. MASON
*Attesting Officer*

C. MARSHALL DANN
*Commissioner of Patents and Trademarks*